United States Patent
Talley et al.

(10) Patent No.: US 7,974,230 B1
(45) Date of Patent: Jul. 5, 2011

(54) MITIGATING INTERFERENCE BY LOW-COST INTERNET-BASE-STATION (LCIB) PILOT BEACONS WITH MACRO-NETWORK COMMUNICATIONS

(75) Inventors: Ryan S. Talley, Overland Park, KS (US); Bryan T. Barbee, Olathe, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 965 days.

(21) Appl. No.: 11/854,504

(22) Filed: Sep. 12, 2007

(51) Int. Cl.
*H04B 7/155* (2006.01)

(52) U.S. Cl. ........................................ 370/318; 370/328

(58) Field of Classification Search .................. 370/310, 370/311, 317, 318, 328, 329, 330, 331, 332, 370/333, 334, 335, 336, 337, 338; 455/403, 455/422.1, 436, 500, 507, 522, 63.1, 67.11, 455/67.13, 114.2
See application file for complete search history.

(56) References Cited

U.S. PATENT DOCUMENTS

| | | | |
|---|---|---|---|
| 4,996,715 A | 2/1991 | Marui et al. | |
| 5,634,191 A | 5/1997 | Beasley | |
| 5,767,778 A | 6/1998 | Stone et al. | |
| 5,832,365 A | 11/1998 | Chen et al. | |
| 5,937,332 A | 8/1999 | Karabinis | |
| 6,125,279 A | 9/2000 | Hyziak et al. | |
| 6,141,531 A | 10/2000 | Williams et al. | |
| 6,167,240 A | 12/2000 | Carlsson et al. | |
| 6,219,540 B1 | 4/2001 | Besharat et al. | |
| 6,404,775 B1 | 6/2002 | Leslie et al. | |
| 6,456,652 B1 | 9/2002 | Kim et al. | |
| 6,493,537 B1 | 12/2002 | Ogawa | |
| 7,035,587 B1 | 4/2006 | Yarkosky | |
| 7,088,959 B2 | 8/2006 | Ho et al. | |
| 7,280,510 B2 * | 10/2007 | Lohtia et al. | 370/335 |
| 7,787,899 B1 * | 8/2010 | Talley et al. | 455/522 |
| 7,813,323 B1 * | 10/2010 | Talley et al. | 370/335 |
| 7,848,238 B1 * | 12/2010 | Pawar et al. | 370/235 |
| 2002/0068534 A1 | 6/2002 | Ue et al. | |
| 2003/0119460 A1 | 6/2003 | Zipper | |
| 2004/0204097 A1 | 10/2004 | Scheinert et al. | |
| 2005/0148368 A1 | 7/2005 | Scheinert et al. | |
| 2006/0223444 A1 * | 10/2006 | Gross et al. | 455/67.13 |
| 2007/0042799 A1 * | 2/2007 | Jubin et al. | 455/522 |
| 2007/0054670 A1 | 3/2007 | Kalika et al. | |
| 2008/0188265 A1 * | 8/2008 | Carter et al. | 455/561 |
| 2009/0005043 A1 * | 1/2009 | Claussen et al. | 455/436 |
| 2009/0104912 A1 | 4/2009 | Foster et al. | |

(Continued)

OTHER PUBLICATIONS

Unpublished U.S. Appl. No. 11/854,511, filed Sep. 12, 2007 in the name of Talley et al.

(Continued)

*Primary Examiner* — Aung S Moe
*Assistant Examiner* — Feben Haile

(57) ABSTRACT

Methods and systems are provided for mitigating interference by low-cost Internet-base-station (LCIB) pilot beacons with macro-network communications. In one embodiment, an LCIB transmits a pilot beacon on the forward link of a carrier at a first power level. While transmitting the pilot beacon on the forward link of the first carrier, the LCIB measures a current reverse-noise rise (RNR) on the reverse link of the carrier. The LCIB determines that the current RNR is greater than an RNR threshold, and responsively transmits the pilot beacon on the carrier at a second power level, which is lower than the first power level.

19 Claims, 4 Drawing Sheets

U.S. PATENT DOCUMENTS

| | | | |
|---|---|---|---|
| 2009/0111499 A1* | 4/2009 | Bosch et al. | 455/522 |
| 2009/0135754 A1 | 5/2009 | Yavuz et al. | |
| 2010/0048212 A1* | 2/2010 | Yavuz et al. | 455/436 |
| 2010/0178907 A1* | 7/2010 | Oroskar et al. | 455/418 |

OTHER PUBLICATIONS

Wan Choi, et al., "Automatic On-Off Switching Repeater for DS/CDMA Reverse Link Capacity Improvement," IEEE Communications Letters, vol. 5, No. 4, Apr. 2001, pp. 138-141.

Office Action from U.S. Appl. No. 10/097,415, dated Jun. 21, 2004.

Non-Final Office Action from U.S. Appl. No. 10/222,015, mailed Mar. 24, 2005.

Final Rejection from U.S. Appl. No. 10/222,015, mailed Jul. 29, 2005.

Unpublished U.S. Appl. No. 11/940,159, filed Nov. 14, 2007 entitled "Low-Cost-Internet-Base-Station-(LCIB) User-Adaptation Algorithm".

Unpublished U.S. Appl. No. 12/129,425, filed May 29, 2008 entitled "Low-Cost Internet-Base-Station (LCIB) Radio-Frequency (RF) Adaptation Using Stationary Transceivers".

Unpublished U.S. Appl. No. 12/190,567, filed Aug. 12, 2008 entitled "Manually Configuring Low-Cost Internet-Base-Station (LCIB) Coverage Using an Associated Mobile Station".

Notice of Allowance from U.S. Appl. No. 11/854,511 mailed Aug. 24, 2010.

* cited by examiner

MITIGATING INTERFERENCE BY LOW-COST INTERNET-BASE-STATION (LCIB) PILOT BEACONS WITH MACRO-NETWORK COMMUNICATIONS

BACKGROUND

1. Technical Field

The present invention relates to wireless networks, and, more particularly, to wireless networks that include one or more Low-Cost Internet Base Stations (LCIBs).

2. Description of Related Art a. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro base stations," and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

b. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably with the coverage area provided by the respective device. Note also that "low-cost" is not used herein as a limiting term; that is, devices of any cost may be categorized as LCIBs; however, it will typically be the case that LCIBs cost less on average than macro base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for mitigating interference by low-cost Internet-base-station (LCIB) pilot beacons with macro-network communications. In one aspect of the present invention, an exemplary embodiment may take the form of a method for an LCIB to reduce interference with communications between mobile stations and macro-network base stations, each macro-network base station providing service on at least one carrier, each carrier having a forward link and a reverse link.

In accordance with the method, an LCIB transmits a pilot beacon, wherein transmitting the pilot beacon comprises transmitting the pilot beacon on a forward link of a carrier at a first power level. While transmitting the pilot beacon on the forward link of the carrier, the LCIB measures a current reverse-noise rise (RNR) on a reverse link of the first carrier. The LCIB determines that the current RNR is greater than an RNR threshold, and responsively transmits the pilot beacon on the carrier at a second power level, wherein the second power level is lower than the first power level.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
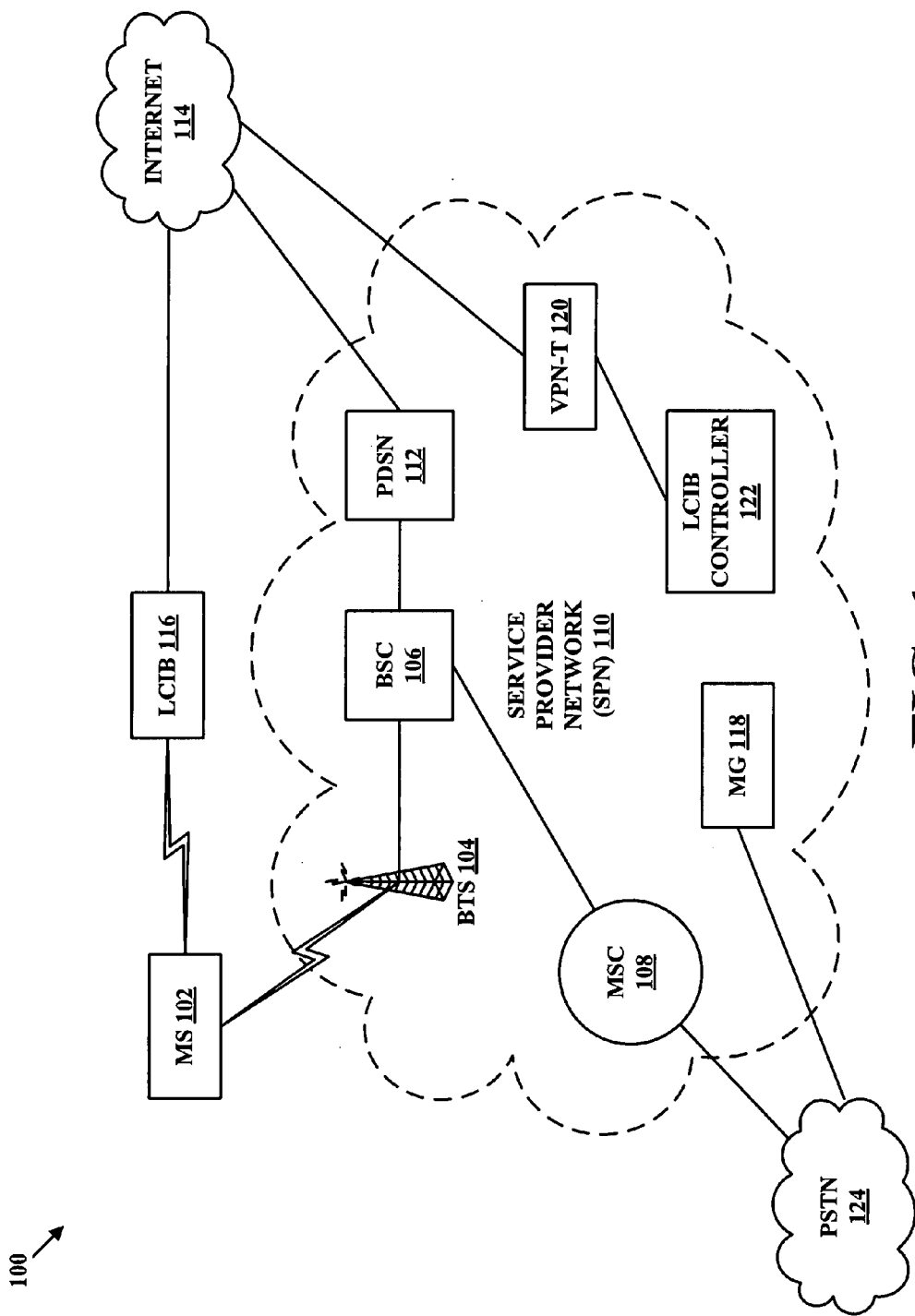
FIG. 1 is a simplified block diagram of a communication system, in accordance with exemplary embodiments.

As noted above, LCIBs are designed to have low transmission-power capabilities, and consequently to provide coverage areas that are relatively limited in comparison with those of typical macro base stations. As examples, a typical LCIB may be designed to provide a coverage area that is the size of a dorm room, an apartment, a house, and so on. And along with limited transmission power, LCIBs are also designed to have a relatively low capacity for serving mobile stations. For example, an LCIB may provide a single CDMA carrier and have the capacity (e.g. channel elements) to provide service to up to five mobile stations at any given time, though any suitable number of channel elements (and/or carriers) may be used in a given implementation.

As described, LCIBs typically emit a pilot beacon that includes administrative messages and parameters that mobile stations can use to facilitate handoffs from the macro network to the LCIB's carrier. In particular, an LCIB's pilot beacon typically includes channels known as the pilot, paging, and sync channels. Thus, among the purposes of the LCIB's pilot beacon is to advertise the LCIB's carrier in the LCIB's coverage area, such that mobile stations can opt to tune to that carrier and communicate via the LCIB. As such, the LCIB transmits its pilot beacon on the one or more macro-network carriers in the surrounding area, and more particularly, on the forward-link component of each of those one or more macro-network carriers.

In particular, after an initial auto-configuration process, an LCIB will transmit either what is known as and referred to herein as a "fixed" pilot beacon, or what is known as and referred to herein as a "frequency-hopping" pilot beacon. If the one or more macro base stations in the surrounding area all operate on the same carrier, the LCIB will transmit its pilot beacon on only that carrier (i.e. a fixed pilot beacon). If, multiple carriers are provided by the surrounding macro network, however, the LCIB will cycle through those carriers, transmitting its pilot beacon on each macro-network carrier for a fixed period of time (i.e. a frequency-hopping pilot beacon), such as a few hundred milliseconds (ms) or perhaps one or two seconds.

Thus, whether the LCIB transmits a fixed or frequency-hopping pilot beacon, this pilot beacon may interfere with macro-network communications that are taking place at the same time and on the same carrier as the LCIB pilot beacon. For example, a user of a mobile station may be conducting a voice call on a macro-network carrier—referred to here as "carrier A"—via a macro-network base station, and walk nearby or into a house where an LCIB is operating. In this example, the surrounding macro-network base stations provide service on carrier A, as well as on carriers referred to here as "carrier B" and "carrier C".

Thus, in this example, the LCIB transmits a frequency-hopping pilot beacon, which cycles through carriers A, B, and C, transmitting its pilot beacon on each for some fixed amount of time. In most implementations, the LCIB would spend the same amount of time transmitting on each carrier, though this is not required. In this example, the LCIB repeatedly transmits its pilot beacon on carrier A for one second, carrier B for one second, and carrier C for one second.

Thus, for however long the mobile station is in range of the LCIB (and still on the call), the user may experience interference with the call for one second out of every three seconds, i.e. when the LCIB is transmitting its pilot beacon on carrier A. During those times, certain forward-link frames sent from the macro base station to the mobile station on carrier A may be "blanked out" from the perspective of the user of the mobile station. The result of this scenario will likely be poor call quality for the macro-network call with which the LCIB's pilot beacon is interfering; in some cases, the call may experience so much interference that it will be dropped.

As presently contemplated, in accordance with the invention, interference with macro-network calls from the LCIB's pilot beacon is reduced or eliminated. In an embodiment, the LCIB's receiver is tuned to the same carrier on which the LCIB is transmitting its pilot beacon. Continuing the above example, when the LCIB is transmitting its pilot beacon on (the forward link of) carrier A, the LCIB's receiver listens for transmissions on (the reverse link of) carrier A. Likewise, when the LCIB is transmitting its pilot beacon on (the forward link of) carrier B, the LCIB's receiver listens for transmissions on (the reverse link of) carrier B. And when the LCIB is transmitting its pilot beacon on (the forward link of) carrier C, the LCIB's receiver listens for transmissions on (the reverse link of) carrier C. And so on. This is extendible to any number of carriers, without departing from the scope and spirit of the present invention. And, in accordance with the invention, the order in which the LCIB (a) begins to transmit its pilot beacon on a given carrier and (b) begins to listen for transmissions on that carrier can vary.

Furthermore, the LCIB uses its receiver to measure and record a baseline level of reverse-link noise. In one embodiment, the LCIB does this on a per-macro-network-carrier basis. That is, in the present example, the LCIB measures and records a baseline level of reverse-link noise on carrier A, a baseline level of reverse-link noise on carrier B, and a baseline level of reverse-link noise on carrier C. In one embodiment, the LCIB may take measurements on a somewhat continuous (i.e. periodic and frequent) basis, and calculate the baseline level of reverse noise as the average of, for example, the lowest 10% of measurements taken in the previous 24 hours. In that sense, the LCIB is always looking at a rolling window of the previous 24 hours.

In general, this rolling-window approach makes the baseline level of reverse-link noise reflective of a changing RF environment, and reflective of times of day with heavy and light traffic on the reverse link. And many other windows of time, sample values, percentage of measured values, and/or any other variables could be used as well in calculating a baseline level of reverse noise on each carrier. In some embodiments, the LCIB may calculate only a single baseline value using measurements from multiple carriers. And other examples are possible.

As the mobile station that is conducting the call on carrier A of the macro network moves close to the LCIB, and as the LCIB hops to transmitting its pilot beacon on carrier A, the transmission by the mobile station to the macro-network BTS on the reverse link of carrier A will appear as a high level of reverse noise (i.e. higher than the baseline level that the LCIB is maintaining for carrier A) to the LCIB's receiver, which hops to listening to carrier A's reverse link as it hops to transmitting its pilot beacon on carrier A's forward link. The LCIB would thus determine that there is—or at least that there likely is—a nearby mobile station engaged in a macro-network communication session. In particular, the LCIB may determine that the current level of noise on the reverse link of a given carrier is more than a threshold amount greater than the baseline level of reverse noise for the given carrier. This difference between the current and baseline levels of reverse noise is referred to generally and herein as "reverse-noise rise" (RNR).

Upon detection of the nearby macro-network call, the LCIB may carry out one or more responses. A first such option is reducing its pilot-beacon transmission power for the particular carrier on which the macro-network call is detected. Thus, continuing the above example, the LCIB would reduce its pilot-beacon transmission power for carrier A. The transmission power for the pilot beacon on carriers B and C may be left at their previous levels, as the LCIB has not detected a likelihood that it is interfering with any macro-network calls by virtue of transmitting its pilot beacon on carrier B or C. Of course, if macro-network calls were detected on either or both of those carriers, the LCIB could take the same measures with respect to either of both of carriers B and C as it takes with carrier A. And this applies to all non-interference measures described herein, not just reduction in pilot-beacon-transmission-power level.

In other embodiments, the LCIB may reduce its pilot-beacon transmission power on all three carriers, perhaps by the same degree, or perhaps more so with respect to carriers on which macro-network transmissions are detected. With respect to how much to reduce the pilot-beacon transmission power on one or more carriers, the LCIB could be configured with one or more parameters that define, for example, decibel (e.g. 1 dB) or percentage reductions. Of course, the pilot-beacon transmission power on one or more carriers may be reduced all the way down to a zero level; e.g., the pilot-beacon transmission hardware could be disabled or powered off.

Another response the LCIB may carry out in response to detecting a nearby macro-network communication session, instead of or along with powering the pilot-beacon transmission power down or off with respect to one or more carriers, is for the LCIB to reduce how often it transmits its pilot beacon on one or more carriers. Thus, for example, in response to detecting the above-described macro-network call on carrier A, the LCIB may transit its pilot beacon on carrier A once every ten seconds, rather than once every three seconds as described above. This will tend to reduce interference with macro-network calls.

A linguistic point is worth making here. At various points in this written description, in the claims, and anywhere else herein, it may be the case that how often an LCIB transmits its pilot beacon on a given carrier may be referred to as the "frequency" with which the LCIB transmits its pilot beacon. This usage of "frequency" should not be confused with the usage of the same word in the context of a carrier frequency (e.g. approximately 1.8 MHz) over which communications are conducted. Thus, reducing the frequency with which the LCIB transmits its pilot beacon on a given carrier does not mean, e.g., transitioning from (a) emitting a signal with a characteristic, physical-layer, through-the-air frequency of 1.850 MHz to (b) emitting a signal with a characteristic frequency of 1.830 MHz. Rather, it means, e.g., transitioning from (a) transmitting the pilot beacon on the carrier once every five seconds to (b) transmitting the pilot beacon on the carrier once every ten seconds.

Returning to the present invention, another response the LCIB may carry out instead of or in combination with one or more of the other responses described herein would be for the LCIB to reduce the duration of its pilot-beacon transmission on one or more carriers each cycle. Thus, continuing the above example, the LCIB may transmit its pilot beacon on carrier A for a quarter of a second rather than for a full second. Combining the last two responses, the LCIB may transmit its pilot beacon on carrier A for 0.25 seconds every ten seconds, rather than for one second every three seconds. And other values could be used with respect to frequency and/or duration. Combined further with the first-described response, the LCIB may transmit its pilot beacon on carrier A for 0.25 seconds every ten seconds at half the normal level of power. And many other permutations, variations, and combinations of these responses are possible as well.

As a general matter, whatever response or combination of responses is carried out upon determining that a mobile station is engaged in a nearby macro-network communication session, this response or combination of responses may be reversed after a certain amount of time, upon detecting that the RNR on a given carrier has fallen below a given threshold (likely indicating that the macro-network call has terminated and/or that the mobile station has moved far enough away, or perhaps that the call has been handed off to the LCIB itself), or according to any other trigger or set of triggers. Thus, transmission-power levels may be turned back up, the pilot-beacon may be transmitted as frequently as it was before the macro-network call was detected, the duration of the pilot-beacon transmission (i.e. how long the pilot-beacon dwells on a particular carrier) may be increased back to a default value, and so on.

In general, adjusting the LCIB pilot beacon to have less or no power, to be transmitted less frequently, and/or to be transmitted with a shorter duration each cycle, will have the benefit of reducing or even eliminating interference with nearby macro-network communications; it will, however, have the concurrent disadvantage of making it more difficult, less likely, or perhaps in some cases impossible for other mobile stations to acquire the LCIB, and for the mobile station on the macro-network call to acquire the LCIB after it is done with the macro-network communication session. Thus, as a general matter, the sooner the pilot-beacon transmission can be restored to its default behavior, the better.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, and a public switched telephone network (PSTN) 124. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more mobile stations according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

b. An Exemplary LCIB

Figure 2:
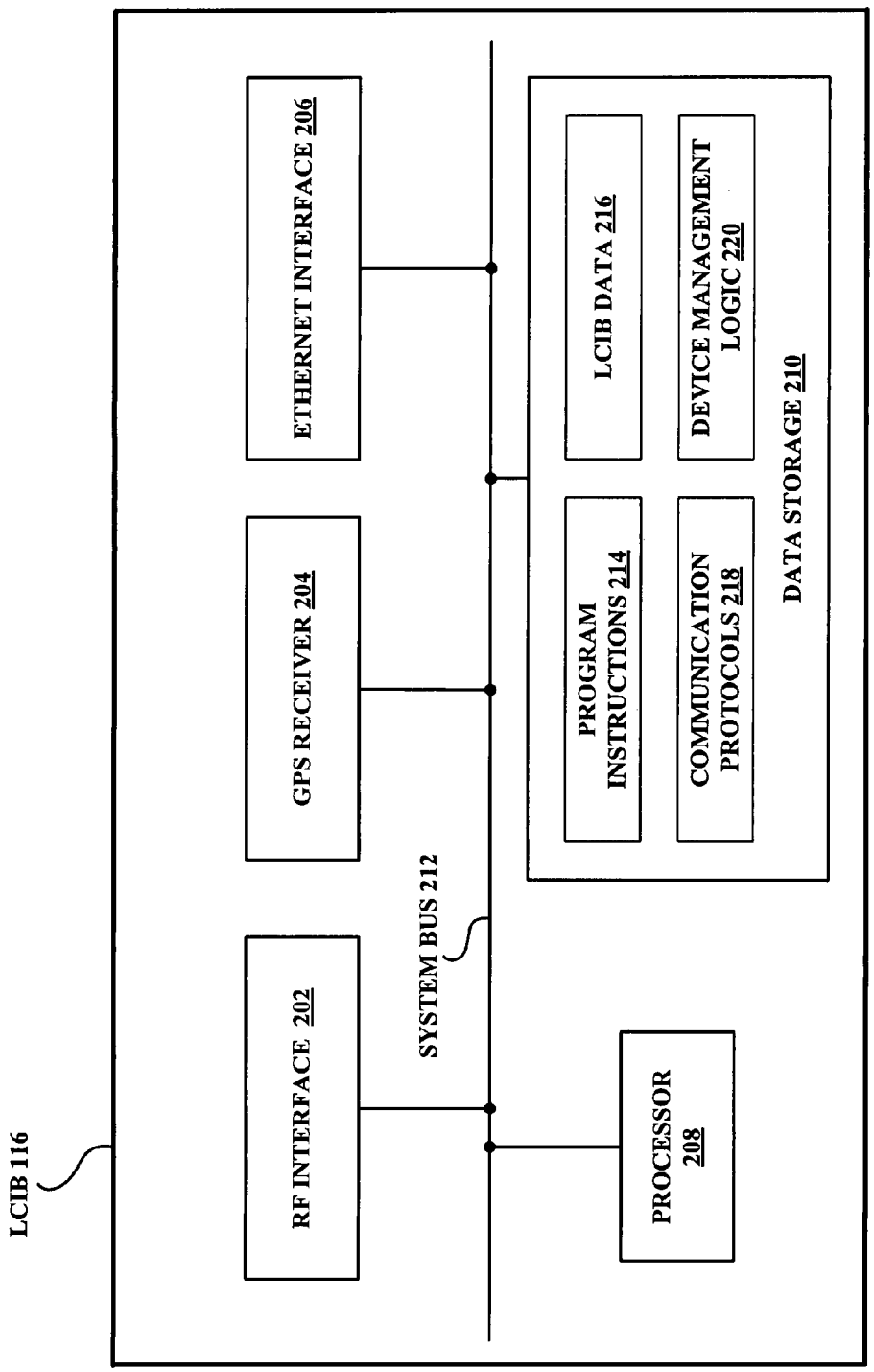
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
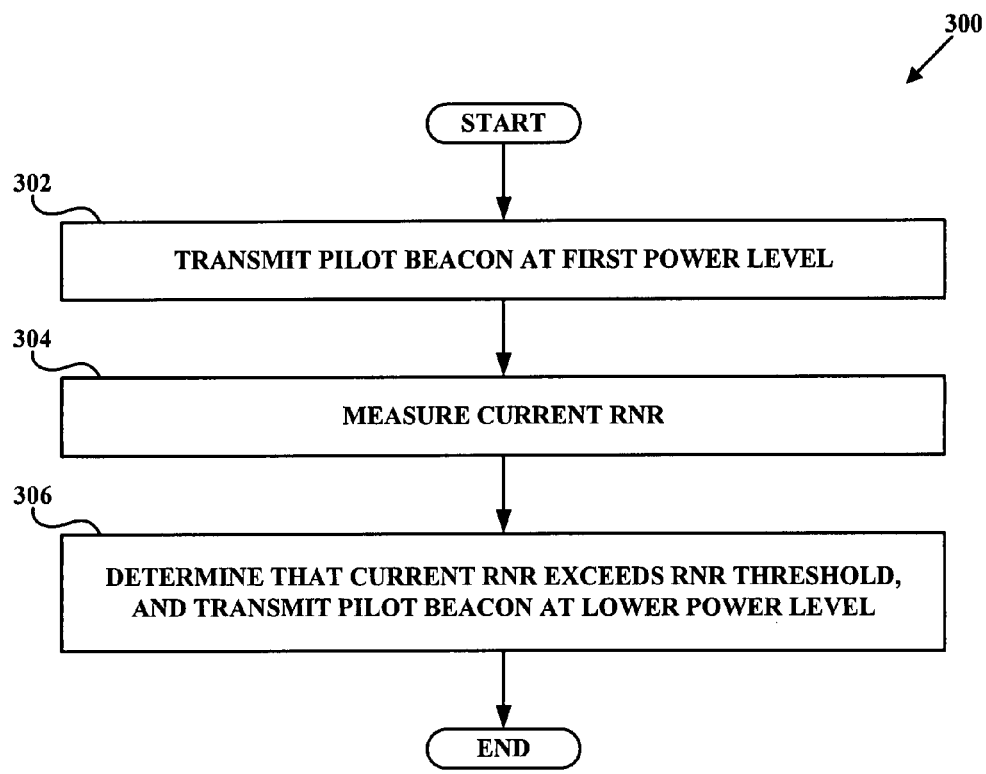
FIG. 3 is a flowchart of a method, in accordance with exemplary embodiments.

FIG. 3 depicts a flowchart of an exemplary method, in accordance with an exemplary embodiment. In particular, FIG. 3 depicts a method 300, which is a method for an LCIB to reduce interference with communications between mobile stations and macro-network base stations, where each macro-network base station provides service on at least one carrier, and where each carrier has a forward link and a reverse link.

As shown in FIG. 3, method 300 begins at step 302, when LCIB 116 transmits a pilot beacon on the forward link of a first carrier at a first power level. At step 304, while transmitting the pilot beacon on the forward link of the first carrier, LCIB 116 measures a current RNR on a reverse link of the first carrier. At step 306, LCIB 116 determines that the current RNR is greater than an RNR threshold, and responsively transmits the pilot beacon on the first carrier at a second power level, which is lower than the first power level.

These steps are further explained in the following subsections. And it should be noted that, although method 300 is described as being carried out by LCIB 116, this is not required. In some embodiments, method 300 may be carried out by LCIB 116 in cooperation with one or more other network entities, such as VPN terminator 120 and LCIB controller 122. In general, method 300 could be carried out by any one or any combination of the network elements described herein, or any other network element(s).

i. Transmit Pilot Beacon at First Power Level

At step 302, LCIB 116 transmits a pilot beacon, which involves transmitting the pilot beacon on the forward link of a first carrier at a first power level. As described above, the pilot beacon may include a pilot channel, a paging channel, and a sync channel, and may generally include data and messages, such as a channel-list message (CLM), that mobile stations may use to establish a connection with LCIB 116.

In some embodiments, the pilot beacon may be a frequency-hopping pilot beacon. In that case, step 302 may involve repeatedly cycling through transmitting the pilot beacon on the forward link of each carrier in a set of carriers, where the set consists of the first carrier and one or more additional carriers. For example, the first carrier may be the above-referenced carrier A, and the set of carriers may be {carrier A, carrier B, carrier C}, where carriers B and C were also referenced above.

LCIB 116 may transmit the pilot beacon on each carrier in the set at a respective default power level for that carrier. LCIB 116 may have a default power level for transmitting the pilot beacon on carrier A, a default power level for transmitting the pilot beacon on carrier B, and a default power level for transmitting the pilot beacon on carrier C. The first power level may be the default for just carrier A, or perhaps for all three carriers.

ii. Measure Current Reverse-Noise Rise (RNR)

At step 304, while transmitting the pilot beacon on the forward link of the carrier A, LCIB 116 measures a current carrier-A RNR on the reverse link of carrier A. The order in which LCIB 116 begins transmitting the pilot beacon on carrier A, and measuring RNR on carrier A, is not important. As described, LCIB 116 may store a baseline level of noise on the reverse link of carrier A. As such, while transmitting the pilot beacon on the forward link of carrier A, LCIB 116 may measure a current level of noise on the reverse link of carrier A, and step 304 may involve calculating the difference between the current and baseline levels of reverse noise on carrier A. Thus, LCIB 116 may measure how far the reverse noise has risen above that baseline. Note that, instead, LCIB 116 may simply measure the current amount of reverse noise on carrier A, which would effectively be computing an RNR above a baseline of zero.

In some embodiments, LCIB 116 may periodically take noise-level measurements on the reverse link of carrier A (and on the reverse links of carriers B and C as well), and frequently and periodically calculate the baseline level for carrier A as, e.g., the average of the lowest 10% of the reverse-noise measurements from the previous 24 hours. However, many other percentages of measurements, time periods, and/or any other parameters could be used by LCIB 116 in calculating the baseline level of noise on the reverse link of carrier A. In some embodiments, LCIB 116 may be provisioned with the baseline. In some embodiments, LCIB 116 may calculate a separate baseline reverse-link noise level for each carrier in the set of carriers on which LCIB 116 transmits its pilot beacon; in other embodiments, LCIB 116 may calculate a single baseline value using data gathered on multiple carriers. And other possibilities exist.

iii. Determine that Current RNR Exceeds Threshold, and Responsively Transmit Pilot Beacon at Lower Power Level At step 306, LCIB 116 determines that the current carrier-A RNR is greater than an RNR threshold stored by LCIB 116. This may indicate that it is likely that a nearby mobile station is conducting a macro-network (voice and/or data) call on carrier A, and thus generating the reverse noise that causes the RNR. The RNR threshold may be particular to carrier A (and LCIB 116 may maintain thresholds particular to carriers B and C as well), or may be the same across the set of carriers on which LCIB 116 transmits its pilot beacon. Further to step 306, responsive to determining that the current carrier-A RNR exceeds the RNR threshold, LCIB 116 transmits the pilot beacon on carrier A at a second power level, which is lower than the first power level.

As examples, the second power level could be zero, half of the first power level, one dB less than the first power level, etc. In the zero case, LCIB 116 could power its pilot-beacon-transmission hardware off or all the way down during the time periods when it would normally be transmitting its pilot beacon on carrier A. At a certain point, LCIB 116 may determine that the current carrier-A RNR has fallen below the RNR threshold, indicating perhaps that the macro-network call has ended and/or the mobile station has moved away, and responsively revert to transmitting the pilot beacon on carrier A at the first (default) power level.

And in general, LCIB 116 may carry out a similar approach with respect to carriers B and C as well. For example, while transmitting the pilot beacon on the forward link of carrier B, LCIB 116 may measure a current carrier-B RNR on the reverse link of carrier B. Upon determining that the current carrier-B RNR exceeds the RNR threshold (which may be a general RNR threshold or a carrier-B-specific RNR threshold), LCIB 116 may transmit the pilot beacon on carrier B at a reduced power level. And upon determining that the current carrier-B RNR has fallen below the threshold, LCIB 116 may turn the pilot-beacon transmission power back up with respect to carrier B. And the same may be carried out with respect to carrier C as well.

Furthermore, in addition to adjusting the transmission power, LCIB 116 may adjust the frequency of transmission of the pilot beacon on one or more carriers as well. For example, LCIB 116's default setting may be to transmit its pilot beacon on the forward link of carrier A once every first amount of time, such as once every three seconds. However, responsive to determining that the current carrier-A RNR is greater than the RNR threshold, LCIB 116 may transmit the pilot beacon on carrier A once every second amount of time, where the second amount of time is greater than the first amount of time. As an example, LCIB 116 may transition to transmitting the pilot beacon on carrier A once every ten seconds. Upon determining that the current carrier-A RNR has fallen below the RNR threshold, LCIB 116 may responsively revert to transmitting the pilot beacon on carrier A at the default power level and frequency. And this may be carried out with respect to one or both of carriers B and C as well.

Another response that LCIB 116 may take in response to determining that the current RNR for a given carrier exceeds the RNR threshold is to shorten the duration of transmission of the pilot beacon each cycle. That is, LCIB 116's default behavior may be to transmit the pilot beacon on the forward link of a given carrier for a first amount of time each cycle. Responsive to determining that the current RNR is greater than the RNR threshold, LCIB 116 may transmit the pilot beacon on the given carrier for a second amount of time each cycle, where the second amount of time is less than the first amount of time. For example, LCIB 116 may transmit the pilot beacon on carrier A for 0.50 seconds per cycle, rather than for 1.00 second per cycle.

As with the other example responses to detecting an RNR above a certain threshold, this duration-shortening response may be applied to any carrier on which LCIB 116 transmits its pilot beacon. And upon detecting that the RNR on a given carrier has fallen below the RNR threshold, LCIB 116 may revert to a default duration per cycle, such as 1.00 second per cycle. And any combination of the above-described responses related to transmission power, frequency, and duration may be used, without departing from the scope and spirit of the present invention.

b. A Second Exemplary Method

Figure 4:
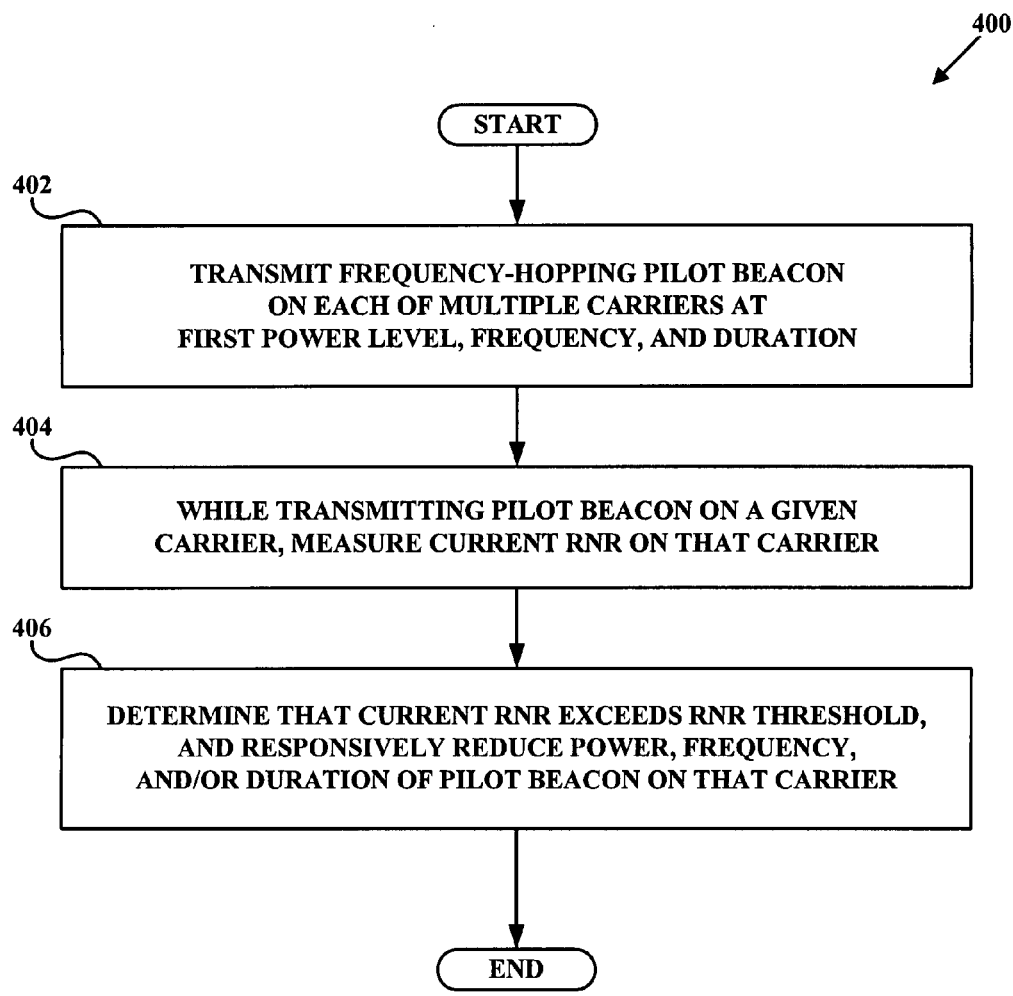
FIG. 4 is a flowchart of a method, in accordance with exemplary embodiments.

FIG. 4 is a flowchart of a second exemplary method, in accordance with an exemplary embodiment. In particular, FIG. 4 depicts a method 400 for an LCIB to reduce interference with communications between mobile stations and macro-network base stations, where each macro-network base station provides service on at least one carrier, and where each carrier has a forward link and a reverse link. Note that method 400 may be carried out by an LCIB, such as LCIB 116, or perhaps by an LCIB in cooperation with one or more other entities, such as VPN terminator 120 and/or LCIB controller 122. Furthermore, method 400 is related in some respects to method 300, and thus is not described in as great of detail.

As shown in FIG. 4, method 400 begins at step 402, when LCIB 116 transmits a frequency-hopping pilot beacon, which involves repeatedly cycling through transmitting the pilot beacon on the forward link of each carrier in a set of carriers (such as {carrier A, carrier B, carrier C}) at a first power level, once every first amount of time, and for a second amount of time each cycle. At step 404, while transmitting the pilot beacon on the forward link of carrier A, LCIB 116 measures a current RNR on the reverse link of carrier A.

At step 406, LCIB 116 determines that the current RNR on the reverse link of carrier A is greater than an RNR threshold, which may be a carrier-A-specific RNR threshold, or may be an RNR threshold that is applicable to multiple carriers, perhaps applicable to all three carriers in the set of carriers on which LCIB 116 transmits its pilot beacon. Further to step 406, in response to determining that the current RNR exceeds the RNR threshold, LCIB 116 may carry out one or more of the following responses: (a) transmitting the pilot beacon on carrier A at a reduced power level, (b) transmitting the pilot beacon on carrier A less frequently, and (c) transmitting the pilot beacon on carrier A for a shorter duration of time each cycle.

4. Conclusion

Various exemplary embodiments have been described above. Those skilled in the art will understand, however, that changes and modifications may be made to those examples without departing from the scope of the claims.

What is claimed is:

1. A method for a low-cost Internet base station (LCIB) to reduce interference with communications between mobile stations and macro-network base stations, each macro-network base station providing service on at least one carrier, each carrier having a forward link and a reverse link, the method comprising:
   an LCIB storing a baseline level of reverse noise on a reverse link of a first carrier;
   the LCIB transmitting a pilot beacon, wherein transmitting the pilot beacon comprises transmitting the pilot beacon on a forward link of the first carrier at a first power level;
   while transmitting the pilot beacon on the forward link of the first carrier, the LCIB measuring a current level of reverse noise on the reverse link of the first carrier, and calculating a current first-carrier reverse-noise rise (RNR) as the difference between the current and baseline levels of reverse noise on the reverse link of the first carrier; and
   the LCIB determining that the current first-carrier RNR is greater than an RNR threshold, and responsively transmitting the pilot beacon on the first carrier at a second power level, wherein the second power level is lower than the first power level.

2. The method of claim 1, wherein the pilot beacon is a frequency-hopping pilot beacon, wherein transmitting the pilot beacon further comprises repeatedly cycling through transmitting the pilot beacon on the forward link of each carrier in a set of carriers, the set consisting of the first carrier and one or more additional carriers.

3. The method of claim 2, further comprising:
   while transmitting the pilot beacon on the forward link of a given additional carrier, the LCIB measuring a current additional-carrier RNR on the reverse link of the additional carrier; and
   the LCIB determining that the current additional-carrier RNR is greater than the RNR threshold, and responsively transmitting the pilot beacon on the given additional carrier at the second power level.

4. The method of claim 2, wherein the frequency-hopping pilot beacon transmits the pilot beacon on the forward link of the first carrier once every first amount of time, the method further comprising:
   responsive to determining that the current first-carrier RNR is greater than the RNR threshold, the LCIB transmitting the pilot beacon on the first carrier once every second amount of time, wherein the second amount of time is greater than the first amount of time.

5. The method of claim 4, further comprising:
   the LCIB determining that the current first-carrier RNR has fallen below the RNR threshold, and responsively reverting to transmitting the pilot beacon on the first carrier (a) at the first power level and (b) once every first amount of time.

6. The method of claim 4, wherein the frequency-hopping pilot beacon transmits the pilot beacon on the forward link of the first carrier for a third amount of time each cycle, the method further comprising:
   responsive to determining that the current first-carrier RNR is greater than the RNR threshold, the LCIB transmitting the pilot beacon on the first carrier for a fourth amount of time each cycle, wherein the fourth amount of time is less than the third amount of time.

7. The method of claim 2, wherein the frequency-hopping pilot beacon transmits the pilot beacon on the forward link of the first carrier for a first amount of time each cycle, the method further comprising:

responsive to determining that the current first-carrier RNR is greater than the RNR threshold, the LCIB transmitting the pilot beacon on the first carrier for a second amount of time each cycle, wherein the second amount of time is less than the first amount of time.

8. The method of claim 7, further comprising:

the LCIB determining that the current first-carrier RNR has fallen below the RNR threshold, and responsively reverting to transmitting the pilot beacon on the first carrier (a) at the first power level and (b) for the first amount of time each cycle.

9. The method of claim 2, wherein transmitting the pilot beacon on each carrier in the set comprises transmitting the pilot beacon on each carrier in the set at a respective default power level for each carrier, wherein the default level for the first carrier is the first power level.

10. The method of claim 9, wherein the default power level for every carrier in the set is the first power level.

11. The method of claim 10, further comprising:

responsive to determining that the current first-carrier RNR is greater than the RNR threshold, the LCIB transmitting the pilot beacon on the additional carriers in the set at the second power level.

12. The method of claim 11, wherein the second power level is selected from the group consisting of zero, half of the first power level, and one dB less than the first power level.

13. The method of claim 1, wherein the second power level is selected from the group consisting of zero, half of the first power level, and one dB less than the first power level.

14. The method of claim 1, wherein the pilot beacon comprises a pilot channel, a paging channel, and a sync channel.

15. The method of claim 1, wherein storing the baseline level of noise on the reverse link of the first carrier comprises:

periodically taking noise-level measurements on the reverse link of the first carrier; and periodically calculating the baseline level as the average of the lowest X % of the noise-level measurements taken in the previous Y hours.

16. The method of claim 15, wherein X equals 10, and wherein Y equals 24.

17. The method of claim 1, further comprising:

the LCIB determining that the current first-carrier RNR has fallen below the RNR threshold, and responsively reverting to transmitting the pilot beacon on the first carrier at the first power level.

18. A low-cost Internet base station (LCIB) for reducing interference with communications between mobile stations and macro-network base stations, each macro-network base station providing service on at least one carrier, each carrier having a forward link and a reverse link, the LCIB comprising:

a communication interface;

a processor; and data storage comprising instructions executable by the processor to:

store a baseline level of noise on a reverse link of a first carrier;

transmit a pilot beacon on a forward link of the first carrier at a first power level;

while transmitting the pilot beacon on the forward link of the first carrier, measure a current level of reverse noise on the reverse link of the first carrier, and calculate a current first-carrier reverse-noise rise (RNR) as the difference between the current and baseline levels of reverse noise on the reverse link of the first carrier; and determine that the current first-carrier RNR is greater than an RNR threshold, and responsively transmit the pilot beacon on the first carrier at a second power level, wherein the second power level is lower than the first power level.

19. A method for a low-cost Internet base station (LCIB) to reduce interference with communications between mobile stations and macro-network base stations, each macro-network base station providing service on at least one carrier, each carrier having a forward link and a reverse link, the method comprising the LCIB:

storing a baseline level of noise on a reverse link of a first carrier;

transmitting a frequency-hopping pilot beacon, wherein transmitting the pilot beacon comprises repeatedly cycling through transmitting the pilot beacon on the forward link of each carrier in a set of carriers at a first power level, once every first amount of time, and for a second amount of time each cycle, wherein the set of carriers includes the first carrier;

while transmitting the pilot beacon on the forward link of the first carrier, measuring a current level of reverse noise on the reverse link of the first carrier, and calculating a current first-carrier reverse-noise rise (RNR) as the difference between the current and baseline levels of reverse noise on the reverse link of the first carrier; and determining that the current first-carrier RNR is greater than an RNR threshold, and responsively carrying out one or more of (a) transmitting the pilot beacon on the first carrier at a second power level, wherein the second power level is lower than the first power level, (b) transmitting the pilot beacon on the first carrier once every third amount of time, wherein the third amount of time is greater than the first amount of time, and (c) transmitting the pilot beacon on the first carrier for a fourth amount of time each cycle, wherein the fourth amount of time is less than the second amount of time.

* * * * *